United States Patent
Olsen

[11] 3,814,831
[45] June 4, 1974

[54] METAL-ENCLOSED HIGH VOLTAGE LINE

[75] Inventor: Willi Olsen, Berlin, Germany

[73] Assignee: Siemens Aktiengesellschaft, Berlin & Munchen, Germany

[22] Filed: Nov. 23, 1971

[21] Appl. No.: 201,464

[30] Foreign Application Priority Data
Nov. 27, 1970 Germany.......................... 2059330

[52] U.S. Cl. .............................. 174/28, 174/22 C
[51] Int. Cl. ............................................ H01b 9/04
[58] Field of Search .... 174/22 R, 22 C, 23 R, 25 R, 174/25 G, 26 G, 28, 29, 16 B, 99 B

[56] References Cited
UNITED STATES PATENTS

| | | | |
|---|---|---|---|
| 3,324,272 | 6/1967 | Shankle et al. | 174/28 X |
| 3,331,911 | 7/1967 | Whitehead | 174/28 X |
| 3,372,226 | 3/1968 | Sewell | 174/22 C |
| 3,391,243 | 7/1968 | Whitehead | 174/28 |
| 3,448,202 | 6/1969 | Whitehead | 174/28 |
| 3,573,342 | 4/1971 | Graybill | 174/28 X |
| 3,610,947 | 10/1971 | Stephanides | 174/28 X |
| 3,629,486 | 12/1971 | Swampillai | 174/28 X |

*Primary Examiner*—A. T. Grimley
*Attorney, Agent, or Firm*—Herbert L. Lerner

[57] ABSTRACT

A disc-shaped insulating body coaxially mounted on an electrical conductor supports the conductor in a surrounding metal enclosure. The insulating body fills in the inner cross-section of the enclosure preferably in a gas-tight manner. A sealed flame-resistant ring is provided at the inner surface of the enclosure adjacent the insulating body and has a length in axial directions which is greater than the length in axial directions of the insulating body and which is at least 100 mm. The ring protects the enclosure from burnout or melting which may be caused by a light arc driven toward the insulating body by current forces.

4 Claims, 1 Drawing Figure

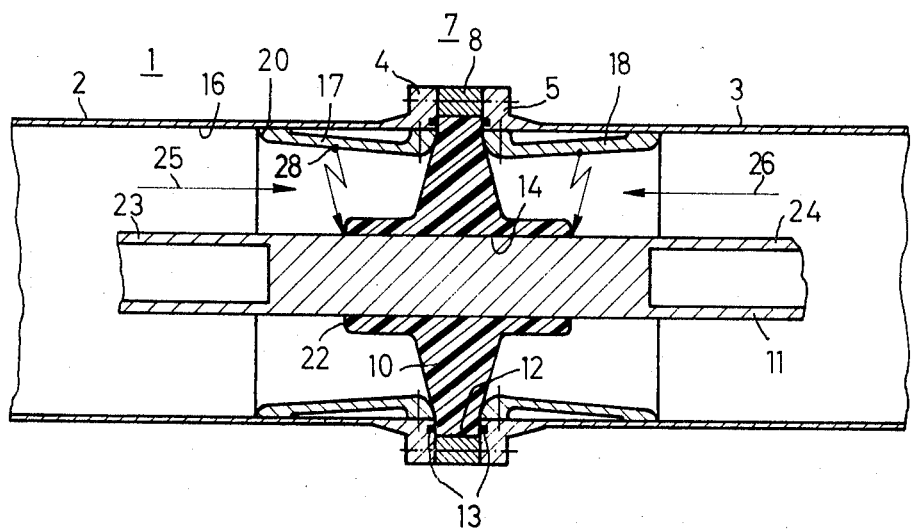

METAL-ENCLOSED HIGH VOLTAGE LINE

The invention relates to a metal-enclosed high voltage line.

In the metal-enclosed high voltage line of the invention, a disc-shaped insulating body supports the high voltage conductor in the metal enclosure in the same manner as a bushing. The high voltage conductor is coaxially positioned in the hollow cylindrical enclosure which surrounds said conductor. The insulating body fills in the inner cross-section of the metal enclosure, so that it provides preferably a gas-tight partition. The cross-section of the insulating body may be symmetrical to a sectioning plane perpendicular to and through the axis of the electrical conductor and the metal enclosure. However, the insulating body may have an asymmetrical structure such as, for example, a hollow conical configuration.

Metal-enclosed high voltage lines of the aforedescribed type are usually insulated with gas under pressure, particularly sulfur hexafluoride. Such lines are utilized in metal-enclosed high voltage transmission lines as single phase bus bars and as connecting lines. The metal enclosure is always grounded, so that it is assumed that operating personnel may work in the immediate vicinity of the enclosure without danger. This, however, depends upon the metal enclosure not being destroyed, even by the occurrence of a disturbance caused primarily by a light arc or light arcs. To prevent such destruction, considerable expenditure in equipment and funds is required with regard to the enclosure, if it is to have a reliable structure.

The principal object of the invention is to provide a metal-enclosed high voltage line having a metal enclosure of simple structure which is inexpensive in manufacture and which functions to prevent its own destruction.

An object of the invention is to provide a metal-enclosed high voltage line of simple but economical structure which prevents the destruction of the metal enclosure with efficiency, effectiveness and reliability.

Another object of the invention is to provide a metal-enclosed high voltage line of simple but economical structure which functions with efficiency, effectiveness and reliability.

In order to prevent the destruction of the metal enclosure, and in accordance with the invention, a sealed flameresistant ring is provided at the inner surface of the metal enclosure adjacent the insulating body. The ring has a length in axial directions which is greater than the length in axial directions of the insulating body and which is at least 100 mm.

The invention permits the production of the metal enclosure with less expense and greater facility than was known prior to the invention. The limit of the metal enclosure is not its mechanical stability determined by its structure and, possibly, filling the installation with gas. Rather, the limit is attained through the stability of the metal enclosure with regard to interfering or disturbing light arcs. Intensive tests have proven that resistance to the light arcs is considerably increased, at a small cost, by the flame-resistant ring of the invention.

The flame-resistant ring of the invention ensures that an interfering or disturbing light arc occurring in the metal enclosure of the high voltage line, which light arc is unavoidably moved by current forces toward the disc-shaped insulating body which is in the current path, will reach said ring. The base of the light arc, which begins at the inner surface of the metal enclosure of the high voltage ring, thus reaches the flame-resistant ring. When the flame-resistant ring is of suitable structure, the base of the light arc may remain at said ring until said light arc is extinguished. This prevents the destruction of the metal enclosure.

The thin thickness of the metal enclosure of the high voltage line, which is adequate for mechanical stability, could not, prior to the present invention, be utilized to resist a light arc. The invention is therefore particularly useful for enclosures comprising non-magnetic steel which may comprise only appropriately thin sheet metal, due to its high cost. The invention is also of great importance for enclosures of light metal having a low resistance to arcs, even when they are of greater thickness.

The flame-resistant ring of the invention should not be confused with buffers or stops utilized for affixing insulating bodies in metal enclosures. Stops of this type have small dimensions in the axial directions and are therefore unable to prevent an interfering or disturbing light arc from burning through the enclosure.

In order for the ring of the invention to provide adequate flame resistance, it is usually sufficient, if the same materials are utilized for the enclosure and the ring, to increase the radial thickness of the ring. The radial thickness of the flame-resistant ring may thus be at least twice that of the enclosure. The flame-resistant ring may have a radial thickness which is many times that of the enclosure. If, however, the material of the ring is particularly flame resistant, its radial thickness may be correspondingly less.

In a conventional metal-enclosed high voltage line, two flame-resistant rings may be utilized, one one each side of the disc-shaped insulating body. The rings are of symmetrical structure and are symmetrically positioned. The protection of the metal enclosure provided by the rings of the invention then no longer depends upon the point of occurrence of the light arc and on its direction of travel. When the flow of current from a source of energy to a load follows a specific direction, it may be adequate to provide only a single ring of the invention, on one side of the disc-shaped insulating body.

As hereinbefore mentioned, the invention reduces the cost of manufacture of the metal enclosure. At the same time, the cost of the enclosure may be further reduced if the flame-resistant ring functions as an electrical shield for the circumferential surface of the disc-shaped insulating body facing the enclosure. The electrical shielding of the insulating body by the ring provides greater electrical stability.

In contrast with the customary hollow electrical conductors or tubes, it is expedient to utilize a solid body as the electrical conductor in the vicinity of the flame-resistant ring or rings. Such a conductor is less sensitive to light arcs, so that during the occurrence of a light arc the insulating body functions as a reliable partition in the enclosure and impedes the advance of the arc in the vicinity of said conductor, since burnout of said conductor is impossible.

In order that the invention may be readily carried into effect, it will now be described with reference to the accompanying drawing, wherein the single FIG- URE is a schematic sectional view of an embodiment of the metal-enclosed high voltage line of the invention.

The FIGURE illustrates, in longitudinal section, a metal-enclosed high voltage 220 kilovolt line which may be a single phase of a three phase bus bar in a high voltage installation and which may be insulated with sulfur hexafluoride. In the FIGURE, a metal enclosure 1 comprises hollow cylinders or cylindrical tubes 2, 3, and so on, which are bolted together via flanges 4 and 5 on the cylindrical enclosures 2 and 3, respectively. The hollow cylinders 2 and 3 comprise a light metal and the flanges 4 and 5 thereof are welded thereto.

The flanges 4 and 5 of the hollow cylinders 2 and 3, respectively, are joined to each other at a junction point 7. An intermediate member 8 of annular configuration is provided at the junction point 7 of the flanges 4 and 5. The intermediate member 8 permits the accommodation of a disc-shaped insulating body 10 without force. The disc-shaped insulating body 10 may comprise cast resin. The insulating body 10 is coaxially mounted on and encloses a high voltage conductor 11.

The disc-shaped insulating body 10 has extending portions 22 of tubular configuration which extend in the directions of the axis of the high voltage line. The axis of the high voltage line is that of the high voltage conductor 11, the enclosure 1 and the disc-shaped insulating body 10. The insulating body 10 has a circumferential surface 12 facing the enclosure 1.

The cicumferential surface 12 is the outer edge of the insulating body 10 and extends beyond the inner cross-section of the enclosure. That is, the radius of the insulating body 10 is greater than that of the enclosure 1. Thus, the insulating body 10 is positioned in gas-tight relation between the flanges 4 and 5. Sealing or packing rings 13 assist in providing a gas-tight mounting of the insulating body 10. The insulating body 10 thus provides a partition in the enclosure 1. The insulating body 10 is tightly mounted on the high voltage conductor 11, so that a gas-tight connection is also provided at the inner surface 14 of said insulating body.

In accordance with the invention, and as illustrated in the FIGURE, one or two flame-resistant rings 17 and 18 are provided adjacent the edges 12 of the insulating body 10 at the inner surface face 16 of the enclosure 1. The flame-resistant rings 17 and 18 are of the same and symmetrical structure and are symmetrically positioned on both sides of the insulating body 10. The flame-resistant rings 17 and 18 may be cast and have a radial thickness which is greater than twice the radial thickness of the enclosure 1.

The length in axial directions of each of the flame-resistant rings 17 and 18 is approximately equal to the radius of the enclosure 1. In the illustrated embodiment, this corresponds to a length of 300 mm. Each of the flame-resistant rings 17 and 18 has an edge 20, which is farthest from the insulating body 10, which extends beyond the tubular portions 22 of said insulating body by approximately half its length, in axial directions. That is, each of the flame-resistant rings 17 and 18 extends beyond the corresponding axial edge of the insulating member 10 by approximately half the axial length of the ring.

The high voltage conductor 11 is of solid structure in the vicinity of the flame-resistant rings 17 and 18. The high voltage conductor 11 is of tubular structure beyond the vicinity of the flame-resistant rings 17 and 18. The high voltage conductor 11 thus has tubular portions 23 and 24 extending from corresponding ends of its solid body. This structure of the high voltage conductor 11 provides a high resistance to arcs in the vicinity of the insulating body.

If a light arc occurs on the enclosure 1 and is driven by current forces in the directions indicated by arrows 25 and 26 toward the insulating body 10, the base 28 of the light arc which faces the inner surface 16 of the enclosure 1 will reliably reach the flame-resistant ring 17 or the flame-resistant ring 18. This prevents the burnout or burning through of the enclosure 1 itself. The solid structure of the electrical conductor 11 in the vicinity of the rings 17 and 18 also ensures that the partition formed by the insulating body 10 will not be by-passed by ionizing gases which may move along said conductor.

In the illustrated embodiment of the metal-enclosed high voltage line of the invention, it is assumed that the flame-resistant rings 17 and 18 comprise the same material as the enclosure 1. The rings 17 and 18 may comprise, however, material which is different from, and even of higher quality than, the material of the enclosure 1. It is advisable, in selecting the appropriate materials, to consider the workability of the selected materials, in order to preserve the configurations of the illustrated embodiment of the invention in order to provide a dielectric shield for the circumferential surface or edge 12 of the insulating body 10.

While the invention has been described by means of a specific example and in a specific embodiment, it should not be limited thereto, for obvious modifications will occur to those skilled in the art without departing from the spirit and scope of the invention.

I claim:

1. A metal-enclosed high voltage line comprising an electrical conductor, a metal enclosure having an inner surface and surrounding the conductor, a disc-shaped insulating body coaxially mounted on the conductor and supporting said conductor coaxially in said enclosure, said insulating body filling in the inner cross-section of the enclosure in a gas-tight and arc-impermeable manner and having a diameter greater than the diameter of the inner surface and therefore, an outer portion, including the rim of the disc, radially extending beyond the inner surface and said insulating body having a length in axial directions, means defining an annular recess receiving the outer portion of the insulating body, at each side of the insulating body a respective sealed flame-resistant ring for preventing destruction of ancapsulation during a continuous disturbance of an arc, including electrically shielding the outer portion of the insulator body, each of said flame-resistant rings being placed at the inner surface of the enclosure adjacent the insulating body and having an annular face abutting against an annular portion of the insulating body, the radial outer extremity of the annular portion corresponding to the diameter of the inner surface, each of said rings having a length in axial directions which is greater than the length of the insulating body at the corresponding side of the insulating body and which is at least 100 mm.

2. A metal-enclosed high voltage line as claimed in claim 1, wherein the enclosure has a radial thickness and the ring has a radial thickness at least twice that of the enclosure.

3. A metal-enclosed high voltage line as claimed in claim 1, wherein the conductor comprises a solid body in the vicinity of the ring.

4. A metal-enclosed high voltage line as claimed in claim 1, wherein the rings are of symmetrical structure and are symmetrically positioned.

* * * * *